E. W. HOWE.
AUTOMOBILE RESILIENT WHEEL.
APPLICATION FILED APR. 17, 1914.

1,187,320.

Patented June 13, 1916.
2 SHEETS—SHEET 1.

Witnesses
Philip Terrell
Francis H. Boswell

Inventor
Earl W. Howe
By D. Swift & Co.
his Attorneys

E. W. HOWE.
AUTOMOBILE RESILIENT WHEEL.
APPLICATION FILED APR. 17, 1914.

1,187,320.

Patented June 13, 1916.
2 SHEETS—SHEET 2.

Witnesses
Philip Ferrell
Francis G. Boswell

Inventor
Earl W. Howe
By D. Swift & Co.
his Attorneys

UNITED STATES PATENT OFFICE.

EARL W. HOWE, OF WASHINGTON, DISTRICT OF COLUMBIA.

AUTOMOBILE RESILIENT WHEEL.

1,187,320.       Specification of Letters Patent.     Patented June 13, 1916.

Application filed April 17, 1914. Serial No. 832,559.

*To all whom it may concern:*

Be it known that I, EARL W. HOWE, a citizen of the United States, residing at Washington city, District of Columbia, have invented a new and useful Automobile Resilient Wheel; and I do hereby declare the following to be a full, clear, and exact description of the invention, such as will enable others skilled in the art to which it appertains to make and use the same.

This invention relates to a new and useful improved resilient auto wheel.

One of the objects of the invention is the provision of a wheel of this nature comprising a multiplicity of annular rims arranged concentrically with the hub and the outer felly and tire of the wheel, there being resilient means interposed between said rims, for cushioning the wheel.

Another object of the invention is the provision of radial members passing through the rims to hold the same in place, and to compensate for the lateral strains. The radial members may be cylindrical, or in cross section they may be square, oblong or elongated. As the preferable form the resilient means may be porous or spongy rubber, which is interposed between the rims, (which are constructed of sheet metal) the flanges of which rims protect and hold the resilient spongy or porous rubber in place.

Figure 2:
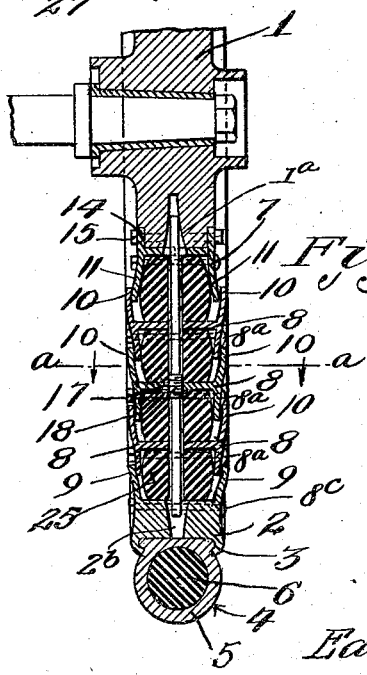

Another feature of the invention is the fact that the flanges of the rims may be extended in order to overlap, as shown in Figure 2, thereby not only guiding the rims additionally in their movements relative to one another, but also insuring against lateral straining and dishing of the wheel.

In lieu of the porous or spongy rubber any suitable resilient springs, such as coil springs or leaf springs may be interposed between the rim, as shown in the drawings, it being particularly understood that the construction of the wheel is not to be confined to any particular form of resilient means. The scheme and the novel features of the invention reside in the radial members passing through the rims, and incased or embodied in the resilient means, thereby not only being protected by the resilient means, but also constituting means in themselves to reinforce the structure and to insure and offset against the lateral strains on the wheel.

Another feature of the invention is the provision of means for attaching the radial members to the rims, that is, in some cases, as illustrated the radial members may be attached to an intermediate rim, in others the radial members may be attached to either the hub member or the felly of the wheel.

In practical fields it may be found necessary to subject the minor details of construction to alterations falling within the scope of what is claimed.

The invention comprises further features and combination of parts as hereinafter set forth, shown in the drawings and claimed.

Figure 1:
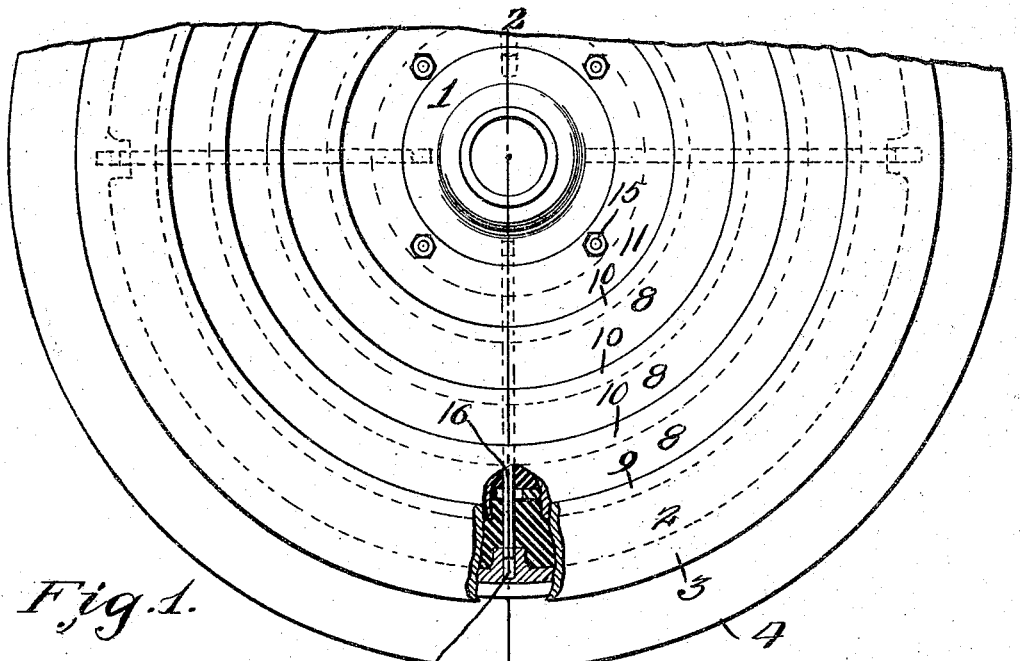
Figure 3:
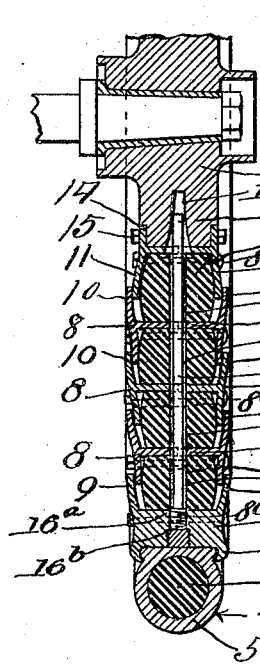
Figure 4:
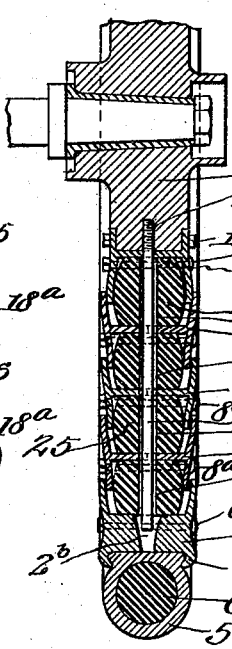
Figure 5:
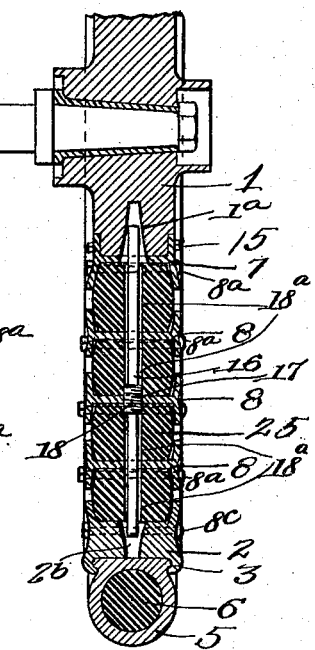
Figure 7:
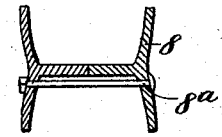
Figure 6:
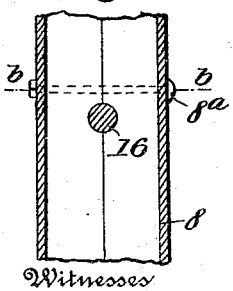

In the drawings:—Fig. 1 is a view in side elevation of a fragmentary portion of the wheel with a portion of the guide flange cut away constructed in accordance with the invention. Fig. 2 is a sectional view on line 2—2 of Fig. 1, showing the interior structure and illustrating the multiplicity of rims having their flanges overlying or overlapping one another, and showing a radial member connected to one of the intermediate rims. Fig. 3 is a sectional view also showing the flanges of the rims overlapping, and the outer end of one of the radial members attached to the outer felly or rim. Fig. 4 is a sectional view also showing the flanges of the rims overlapping, and the inner end of the radial member attached to the hub member. Fig. 5 is a sectional view showing the overlapping flanges of the multiplicity of rims eliminated, in which case this view is similar to Fig. 1 with that exception. Fig. 6 is a sectional view on line *a—a* of Fig. 2. Fig. 7 is a sectional view on line *b—b* of Fig. 6.

Referring to the drawings 1 designates the hub member, which may be of any suitable construction and configuration, while 2 denotes the felly or outer rim of the wheel. This outer felly may be constructed as shown in Figs. 2 and 5, in other words provided with the clench flanges 3, to engage the usual form of tire 4, which may be of any suitable construction. However, in the present instance it is provided with an outer portion of a composition of canvas and rubber material 5 incasing a slightly porous or spongy rubber core 6. In Fig. 3 the outer felly or rim is also provided with the clench flanges 3. Interposed between the inner rim 7, that is, the rim adjacent the hub member, and the outer felly or rim is a multiplicity of rims 8. Each of said rims 8 is constructed in two parts, as shown in Figs. 6 and 7, which two parts are secured together by the bolts 8ª. The outer felly or rim is provided with the flanges 9, which in Figs. 1 to 4 inclusive, overlap the flanges of the adjacent rim, the flanges of the adjacent rim are designated by the numeral 10. The rim 7 is constructed with flanges 11, which underlap the flanges 12 of one of the rims 8. The innermost rim 7 is constructed with additional flanges 14 engaging upon opposite faces or sides of the hub member, there being bolts 15 for securing the rim 7 in place. The rim 7 consists of two parts as shown, which parts are connected to or placed on the hub member from opposite sides, after which the bolts 15 are arranged as shown, to hold the parts to the hub member.

The improved wheel is provided with a plurality of radial members 16, the central portion of each of which is anchored to one of the intermediate rims as shown at 17, by means of the threads 18. Before placing the outer rim or felly 2 (which is constructed in two parts, which are secured together by the bolts 8ᶜ) in place, the radial members are inserted radially through the several intermediate rims and the porous or spongy rubber cushions, until the threads 18 engage the threads of one of the intermediate rims, as shown at 17. This form of construction is shown in Figs. 2 and 5. After so inserting the radial members the outer rim or felly is placed in position, and its two parts secured by the bolt 8ᶜ. The openings 18ª through the porous or spongy rubber cushions and the intermediate rims, excepting the rim into which the central portions are threaded, are of such size as to permit the radial members to have play as the wheel is in motion. The hub member is provided with tapering recesses 1ª, which are of sufficient size to receive and permit play of the inner ends of the radial members when the wheel is in motion. The outer rim or felly is provided with radial openings 2ᵇ, to receive the outer ends of the radial members, and which openings 2ᵇ are of sufficient size as to permit play and movement of the radial members when the wheel is in motion. In Fig. 3, instead of threading the central portions of the radial members to one of the intermediate rims, the outer ends of the radial members are provided with threads 16ª, to thread into the outer rim or felly, there being plugs 16ᵇ threaded into the outer felly or rim to protect and lock the radial members in place. When threading the outer ends of the radial members into the outer rim or felly, the inner ends are loosely mounted in the radial recesses 1ª of the hub. In Fig. 4 the inner ends of the radial members 16 are threaded at 16ᶜ into the hub member 1, while the outer ends are loosely mounted in the radial openings 2ᵇ of the outer rim or felly, so that the radial members will have play when the wheel is in motion. In Figs. 3 and 4 the central threaded portions 18 of the radial members are eliminated, and the said radial members have sufficient play in the openings 18ª of the intermediate rims and the cushion, to permit the parts to coöperate properly as the wheel is in motion. Any number of radial members may be employed, just as required in the manufacturing of a wheel.

In Fig. 5 the overlapping of the flanges of said multiplicity of rims is dispensed with.

Interposed between the multiplicity of rims are resilient or cushioning elements 25, constructed of such material as porous or spongy rubber. In practice this form of resilient means is porous or spongy as stated; not too much so, but only sufficient to permit the various rims to yield and yet have sufficient stability and rigidity to hold the rims properly arranged and spaced apart, and at the same time to assist in offsetting or relieving lateral strains, that is, to aid the radial members and the overlapping flanges.

The rubber cushions or resilient means, do not quite fill the entire cavities between said rims, that is, when the overlapping flanges are utilized, but just sufficient as shown in the drawings, to permit the resilient or rubber means to substantially fill the cavities. When pressure is applied upon the hub member the rims will accordingly yield or move, and just as soon as the pressure is relieved, the rims will assume their original shape, and positions. Furthermore owing to the rims being made of sheet metal, they themselves yield slightly or become distorted, incident to the action of the wheel and the pressure upon the hub, and when this action and pressure is relieved, said rims assume their original position. Moreover, since the rims themselves yield, the resilient means between the rims more freely and quickly respond. The outer rim or felly of the wheel has more rigidity and stability than the other rims, and it is the design of the invention, that this feature should be maintained in the construction of this form of auto wheel, in order that the outer rim or felly will always remain perfectly circular.

When the radial members are attached intermediate their ends to one of the intermediate rims, for instance as by the threads, the opposite ends of said radial members are received loosely in the chambers 1ª of the felly or outer rim, and the hub member. These radial members pass loosely through the multiplicity of rims, as shown at 18ª, and together with the said flanges of the rims act to compensate for the lateral strain on the various parts of the structure.

From the foregoing it will be observed that there has been devised a simple and efficient construction of resilient wheel for automobiles, and one which has been found practical owing to the particular construction, which will maintain its proper rigidity, or stability, as well as offsetting all lateral strain upon the parts.

The invention having been set forth, what is claimed as new and useful is:—

1. In a resilient wheel, a hub member, an outer felly member arranged concentric with the hub member, a multiplicity of resilient rims interposed between the felly member and the hub member, radial means extending from the hub member to the felly member and passing radially through said multiplicity of rims, and having means of connection with one of the members for maintaining the concentricity of said members relative to one another, said radial means also constituting means to offset against lateral strains, and resilient means interposed between the multiplicity of rims, also acting to maintain the concentricity of the felly relative to the hub member, said radial means passing radially through said resilient means.

2. In a resilient wheel, a plurality of circular members diminishing respectively in diameter from the outermost member to the innermost member inclusive, and being arranged concentrically at equal spaced intervals, the members between the inner and outermost members having double guard flanges, circular cushioning elements being arranged concentrically and positioned in said spaced intervals, each of said cushioning elements being continuous and regular in its circular contour, and radial devices, which extend from the innermost member radially through the other members to the outermost member, said radial devices extending radially through the cushioning elements and being attached to one of said members, and constituting means for maintaining the concentricity of said members relative to one another, said guard flanges coöperating with the cushioning elements and together with the radial devices constituting combined means to offset against lateral strains.

In testimony whereof I have signed my name to this specification in the presence of two subscribing witnesses.

EARL W. HOWE.

Witnesses:
ROBERT A. BOSWELL,
PHILIP A. H. TERRELL.

Copies of this patent may be obtained for five cents each, by addressing the "Commissioner of Patents, Washington, D. C."